(12) United States Patent
Spears

(10) Patent No.: US 7,895,591 B2
(45) Date of Patent: Feb. 22, 2011

(54) FILE DEPLOYMENT SYSTEM AND METHOD

(75) Inventor: Joseph L. Spears, Hayward, CA (US)

(73) Assignee: Oracle International Corp., Redwood Shores, CA (US)

( * ) Notice: Subject to any disclaimer, the term of this patent is extended or adjusted under 35 U.S.C. 154(b) by 1778 days.

(21) Appl. No.: 10/970,121

(22) Filed: Oct. 21, 2004

(65) Prior Publication Data

US 2006/0101462 A1    May 11, 2006

(51) Int. Cl.
*G06F 9/45* (2006.01)

(52) U.S. Cl. .................. 717/168; 717/170; 717/172; 717/178

(58) Field of Classification Search .......... 717/168, 717/169, 170, 171, 172, 173, 174, 175, 176, 717/177, 178
See application file for complete search history.

(56) References Cited

U.S. PATENT DOCUMENTS

| | | | |
|---|---|---|---|
| 5,495,610 A | 2/1996 | Shing et al. | |
| 5,583,983 A | 12/1996 | Schmitter | |
| 5,790,796 A | 8/1998 | Sadowsky | |
| 5,949,999 A | 9/1999 | Song et al. | |
| 5,950,209 A | 9/1999 | Carrier, III et al. | |
| 6,047,323 A | 4/2000 | Krause | |
| 6,123,737 A | 9/2000 | Sadowsky | |
| 6,219,829 B1 | 4/2001 | Sivakumar et al. | |
| 6,243,825 B1 | 6/2001 | Gamache et al. | |
| 6,289,393 B1 | 9/2001 | Phillips et al. | |
| 6,314,565 B1 * | 11/2001 | Kenner et al. | 717/171 |
| 6,345,386 B1 | 2/2002 | Delo et al. | |
| 6,360,331 B2 | 3/2002 | Vert et al. | |
| 6,389,126 B1 | 5/2002 | Bjornberg et al. | |
| 6,418,554 B1 | 7/2002 | Delo et al. | |
| 6,546,554 B1 | 4/2003 | Schmidt et al. | |
| 6,973,647 B2 | 12/2005 | Crudele et al. | |
| 7,206,817 B2 | 4/2007 | Fanshier et al. | |
| 7,228,326 B2 * | 6/2007 | Srinivasan et al. | 709/200 |
| 2003/0084056 A1 | 5/2003 | DeAnna et al. | |
| 2003/0135509 A1 | 7/2003 | Davis et al. | |
| 2003/0192031 A1 * | 10/2003 | Srinivasan et al. | 717/120 |
| 2004/0187104 A1 * | 9/2004 | Sardesai et al. | 717/174 |
| 2005/0015761 A1 * | 1/2005 | Chang et al. | 717/174 |
| 2005/0289538 A1 * | 12/2005 | Black-Ziegelbein et al. | 717/177 |
| 2005/0289539 A1 * | 12/2005 | Krishna S | 717/177 |

OTHER PUBLICATIONS

Oracle Corp., Oracle Application Server 10g, New Feature Overview, A Technical White Paper, Dec. 2003, pp. 1-2 and 24-31.
Oracle Corp., Managing the Complete Oracle Environment With Oracle Enterprise Manager 10g Grid Control, An Oracle White Paper, Aug. 2003, pp. 1-3 and 37-39.

* cited by examiner

*Primary Examiner*—Wei Y Zhen
*Assistant Examiner*—Matthew J Brophy
(74) *Attorney, Agent, or Firm*—Kraguljac + Kalnay, LLC

(57) ABSTRACT

Systems, methodologies, media, and other embodiments associated with deploying files are described. One example system embodiment includes a deployment logic configured to automatically prepare one or more files for deployment that are retrievable from a designated location. The deployment logic can also be configured to deploy the one or more files for execution on one or more servers.

27 Claims, 4 Drawing Sheets

FILE DEPLOYMENT SYSTEM AND METHOD

BACKGROUND

The deployment of a software application may involve a variety of operations, for example, configuring the application into a form that is executable, configuring an environment capable of executing the application, and placing the application in the environment. Once the application is successfully deployed, it can be tested for quality assurance and/or may be placed in a production environment for consumer use. Software applications are generally regarded as dynamic files that involve special and/or specific processings or configurations in order to properly prepare the files for execution on a desired computer system. This is in contrast to static files, such as text files and PDF files, that are retrieved and viewed the same way even on different computer systems.

The deployment of a dynamic application may need to set customized parameters for the application. For example, the application may or may not have dependencies to other designated files, may need access to selected databases, and/or may need other types of settings to be configured in order to ensure proper execution of the application. Additionally, different parameters may be set and/or different operations may be performed in order to configure an application for deployment depending on the type of environment it is to execute on. For example, an application may be deployed differently for a quality assurance environment than for a production environment. Applications of different types are handled differently from one another. For example, a J2EE application will typically involve different parameters and different deployment operations to be performed than for a business intelligence application such as forms files and reports files, or a CGI script file, and other file types. Some file types need to be compiled before deployment.

Due to the dynamic nature of applications and their deployment, the deployment process has traditionally relied on manual operations performed by an experienced operator. In one example, a software developer who desires to deploy a file would upload the file to a server and submit a service request to a deployment operator to deploy the file. The deployment operator would retrieve the file and prepare the file for deployment based on, for example, selected parameters, special instructions, or other types of settings that may be requested by the software developer. Other parameters and operations may also need to be performed based on the type of file being deployed and the run-time environment in which the application will execute in. The deployment process is typically time consuming and tedious, and is susceptible to operator errors. Furthermore, once an application is deployed, correction of errors and product enhancements generally mean the application will continually be re-deployed and go through the deployment process numerous times.

BRIEF DESCRIPTION OF THE DRAWINGS

The accompanying drawings, which are incorporated in and constitute a part of the specification, illustrate various example systems, methods, and so on that illustrate various example embodiments of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
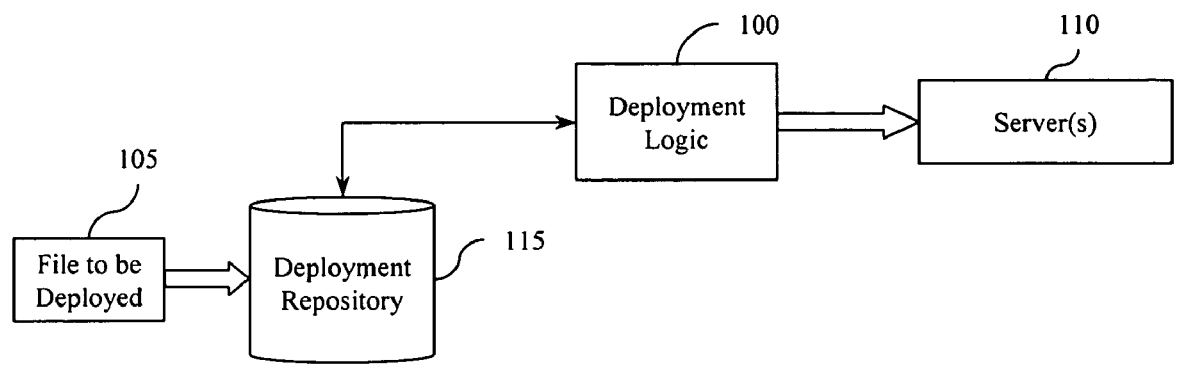
FIG. 1 illustrates one example system embodiment for deploying a file.

Example embodiments of systems, methods, media, and other embodiments are described herein that are associated with deployment of a file or group of files. In one example, a system can be configured to automate a deployment process for a variety of file types that are dynamic in nature. In another example, a deployment logic can be configured to automatically prepare one or more files for deployment from a designated location and the files can be deployed for execution on one or more servers. The deployment logic can be customized to automate the deployment of different file types to reduce the amount of manual operations performed during the deployment process.

In another example, the deployment logic can be configured to make decisions based on a file type of the file to be deployed and use a configuration file that can include instructions for deploying the file type. In this manner, deploying a dynamic application can be handled like static content.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, a file directory, a storage location, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device like a field programmable gate array (FPGA), a memory device containing instructions, combinations of logic devices, or the like. Logic may include one or more gates, combinations of gates, or other circuit components. Logic may also be fully embodied as software, or may be a computer component as defined herein. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted, detected, and/or processed in a desired manner.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, identifying, accessing, determining, matching, or the like, refer to actions and processes of a computer system, logic, processor, or similar electronic device that manipulates and transforms data represented as physical (electronic) quantities.

Illustrated in FIG. 1 is an example deployment system that can facilitate deployment of a file for execution on one or more servers. The system can include a deployment logic 100 that is configured to automatically prepare a file 105 that is to be deployed and deploy the file 105 for execution on one or more servers 110. The file 105 may include multiple files such as a zipped file or packed file that contains multiple files. In one example, the file 105 to be deployed can be uploaded by a software developer to a deployment repository 115. The deployment logic 100 can be configured to retrieve files from the deployment repository 115 and automatically prepare the files for deployment and deploy the files for execution on the one or more servers 110.

As an example scenario, a software developer may be programming a new software application, revising code to correct errors in an application, developing a new release for an application, and the like. At some point, the functionality of the application can be tested in a run-time environment such as a quality assurance environment. This includes deploying the application onto one or more servers for execution. Once the developer is satisfied with the functionality of the application, the application can then be deployed into a production environment where the application can be used for its intended purpose. Of course, different software development environments may have different scenarios associated with deployment of an application.

To initiate the deployment process, the software developer would upload or otherwise transmit the file 105 (that is desired to be deployed) into the deployment repository 115. In one example, the deployment repository 115 can be a designated location such as a file directory within a storage device. The deployment logic 100 can be configured to poll and/or monitor the designated location of the deployment repository 115 to determine if new files for deployment are present. If a new file is present, the file can be accessed by the deployment logic 100 and prepared for deployment. It will be appreciated that there are a variety of ways to obtain contents from a file in the deployment repository 115 and the term "accessing" is used generally to refer to any desired method. For example, the deployment logic 100 can create a copy of a file, create a copy of a file and remove the file from the deployment repository 115, read the contents of the file, and the like.

The deployment logic 100 can then prepare the file 105 for deployment which may also include preparing a run-time environment for the file. The file 105 may include settings, parameters, instructions such as command line options, and/or other instructions that can be used by the deployment logic 100 in order to properly deploy the file 105. In one example, a configuration file can be provided that includes the settings and instructions for deploying an associated file.

For example, different types of files may need to be processed differently in order to deploy the file. As such, the deployment logic 100 can be configured to determine a file type of the file 105 to be deployed and process the file 105 based on its type. For example, if the file 105 to be deployed is an enterprise archive file (EAR), it would be processed differently than a FORMS file. EAR files are packed and need to be unpacked using a series of commands. Content from the files can then be extracted. The EAR file may include or refer to libraries that an operating system and/or a JAVA engine might use to be able to interpret commands that may be within the EAR files. Additionally, the EAR file could be platform specific and require custom settings in order to properly prepare the run-time environment for deployment.

As another example, a FORMS file is a common file type that can be deployed onto a web server that has the capability of running FORMS files. To prepare a FORMS file for deployment, the FORMS file is compiled into a binary format. Due to requirements of FORMS files, the compiling is performed on the web server that will execute the forms and thus, cannot be compiled in advance on a software developer's system. Of course, other types of files can be used and the deployment logic 100 can be configured to handle desired file types.

In one embodiment, a configuration file can be prepared for each type of file that may be deployed by the deployment logic 100. For each file type, the configuration file may include settings, parameters, and/or instructions that may be initially configured as default settings for that file type. The configuration file may also be configured to allow a user or software developer to modify or create a configuration file in order to customize the deployment of a selected file. In that regard, a graphical user interface can be configured and provided to allow a user to access configuration files. In another example, the deployment logic 100 can be programmed to handle a selected file type in a default manner without using a configuration file or when a configuration file is not available.

As one example of what may be included in a configuration file, during run-time, an application may need to access a database that requires a password. The password may be included in the configuration file that is associated with the file during deployment. The location of the database may also be provided in the configuration file so that it can be properly accessed during run-time.

In another example, the configuration file may identify file and/or object dependencies that occur during run-time. The deployment logic 100 can check the dependencies during deployment as identified in the configuration file. Executable instructions may also be included in the configuration file that can be executed during deployment. The instructions may include, for example, a series of commands that are to be executed to compile a FORMS file, or perform other selected functions. It will be appreciated that many types of parameters and instructions may be used in a configuration file based on the file type and/or the run-time environment in which it runs. In this manner, the deployment logic 100 can automatically deploy a file based on its type.

Figure 2:
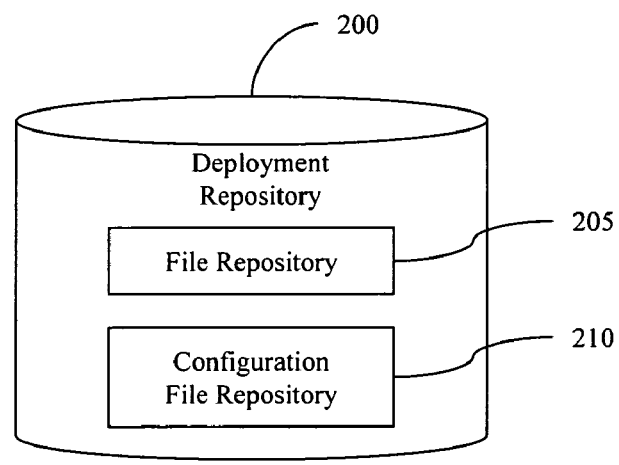
FIG. 2 illustrates one example configuration of a deployment repository.

Illustrated in FIG. 2 is one embodiment of a deployment repository 200. The deployment repository 200 can be configured as a data store that is designated to receive files to be automatically deployed. The deployment repository 200 can be configured to include a file repository 205 that receives the files for deployment, and a configuration file repository 210 that is configured to receive configuration files that can be used to process the deployment of an associated file. It will be appreciated that the file repository 205 and the configuration file repository 210 may be designed as separate data stores or can be designed as a single data store. If a single data store is used, file identifiers may be used in order to distinguish file types from one another.

In another example, if the file to be deployed is a zip file or packed file that includes multiple files, an associated configuration file may be included in the packed file. In this case, the deployment logic 100 (shown in FIG. 1) could be configured to identify the configuration file so that it can be extracted and used during deployment. Of course, the configuration file can be separate from the file to be deployed and the two files can be matched together.

The deployment logic 100 can be configured to identify different file types. By providing different configuration files, the deployment logic 100 can process the different file types for deployment. For example, a plurality of configuration files can be provided where each is associated with a different file type to be deployed. The configuration file can include at least instructions for automatically deploying an associated file type. The instructions can be based on default settings that may be known based on the file type and/or the run-time environment. Custom settings may be made by modifying the configuration file associated with the file to be deployed.

Figure 3:
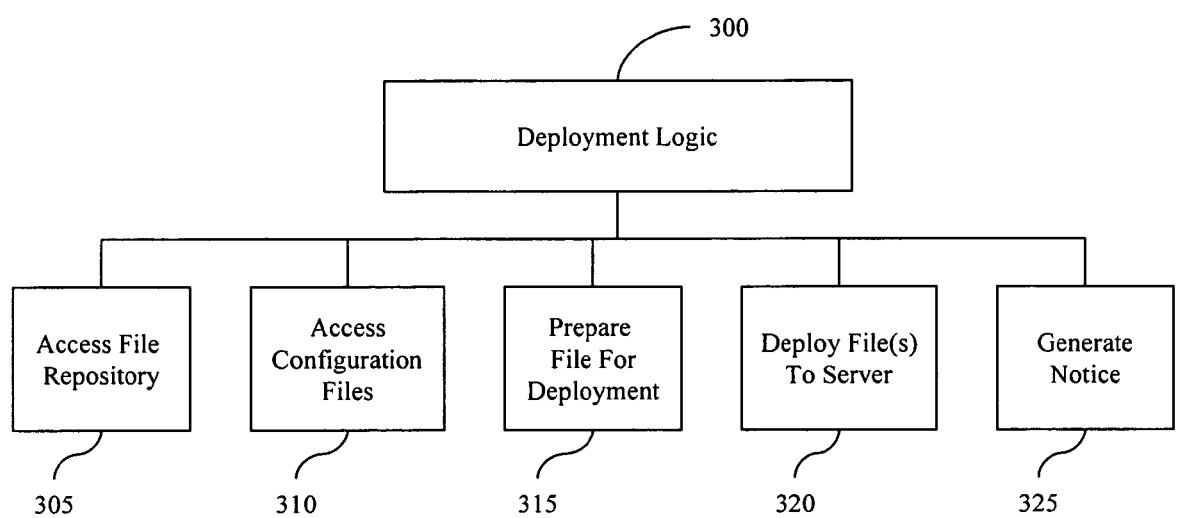
FIG. 3 illustrates another embodiment of a deployment logic for automatically deploying files.

Illustrated in FIG. 3 is another embodiment of a deployment logic 300 that can be configured to deploy different types of files for execution in a run-time environment. The deployment logic 300 can be embodied as processor executable instructions that are provided by a computer-readable medium and can be executable on a computer. The deployment logic 300 can be embodied in a variety of forms such as an executable script, a background task or process that monitors for new files to deploy, an application that is initiated in response to a file being uploaded to the deployment repository 115, 200, or other desired form of logic or computer component. The foregoing also applies to the deployment logic 100 shown in FIG. 1.

The deployment logic 300 can be configured to include a variety of logic components for performing desired actions and functions. For example, a logic 305 can be configured to access a file repository that contains files to be deployed. The file repository can be, for example, a designated location on a storage device that is configured to receive files for deployment such as the deployment repository 115 (shown in FIG. 1) or the deployment repository 200 (shown in FIG. 2). The logic 305 can access the file repository in response to monitoring or polling the designated location to determine if a new file is present. In another example, a separate application or process can be configured to monitor the file repository and then generate a signal that initiates the deployment logic 300 to begin the deployment process.

In response to a new file being present for deployment, the deployment logic 300 can retrieve the file and/or the file's contents to prepare the file for deployment. As previously described, the file may contain multiple files that may need to be ungrouped, unpacked, or otherwise extracted based on the type of file. In that regard, the deployment logic 300 can be configured to determine the type of file that is to be deployed and execute appropriate commands for that type of file. As described in a previous example, one or more configuration files may be maintained or provided that are associated with a file to be deployed. A configuration file can provide settings, parameters, commands to execute, and/or other types of instructions that are to be used for deploying the associated file. A logic 310 can be configured to access an associated configuration file that is matched with the file to be deployed.

Using the matched configuration file, logic 315 can be configured to programmatically prepare the file for deployment, and if needed, prepare a deployment environment in which the file is to execute. For example, the configuration file may provide a series of commands that when executed, unpack the file to be deployed, configure parameters, identify passwords for access to selected files or other systems during run-time, compile the file to be deployed if necessary, set access rights or other types of security, and/or other types of processings as desired. As mentioned previously, the deployment logic 300 can be configured to deploy different types of files by using a configuration file that is generated for a selected file type. The configuration file may also be accessible to a user or software developer in order to allow the developer to customize the settings of the configuration file in order to customize the deployment process of its associated file.

In another embodiment, the deployment logic 300 can be configured to deploy a file based on its file type as a default without using a configuration file. For example, the deployment logic 300 can deploy a file (e.g. file named "foo.x" being of file type "x") in a particular manner using a configuration file that is associated with "foo.x." But, the deployment logic 300 can also be configured to deploy a file (e.g. file named "bar.x") in a default manner based on the file type "x" if there is no configuration file associated with the file "bar.x."

With further reference to FIG. 3, once the file is prepared for deployment and the environment is prepared, a logic 320 can be configured to deploy the file to one or more servers for execution. Depending on the type of file, this may be as simple as placing an executable version of the file on a selected server and any other associated files if used during execution. When the deployment successfully completes, a logic 325 can be configured to automatically generate a notice to the software developer indicating that the file has been deployed and is ready for use.

Figure 4:
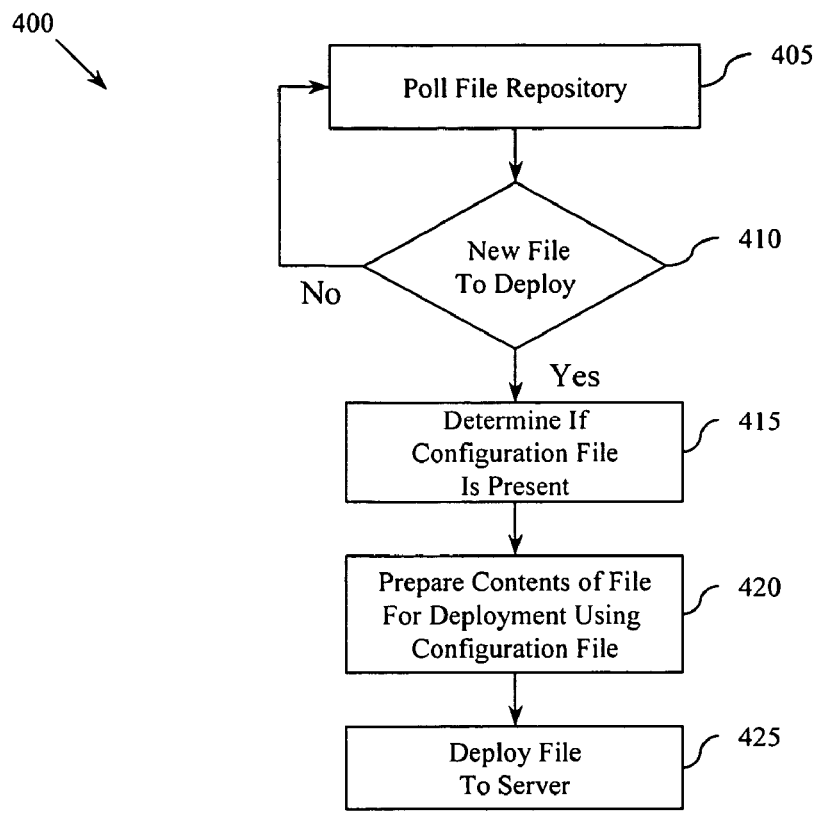
FIG. 4 illustrates an example methodology that can be associated with deploying files.
Figure 5:
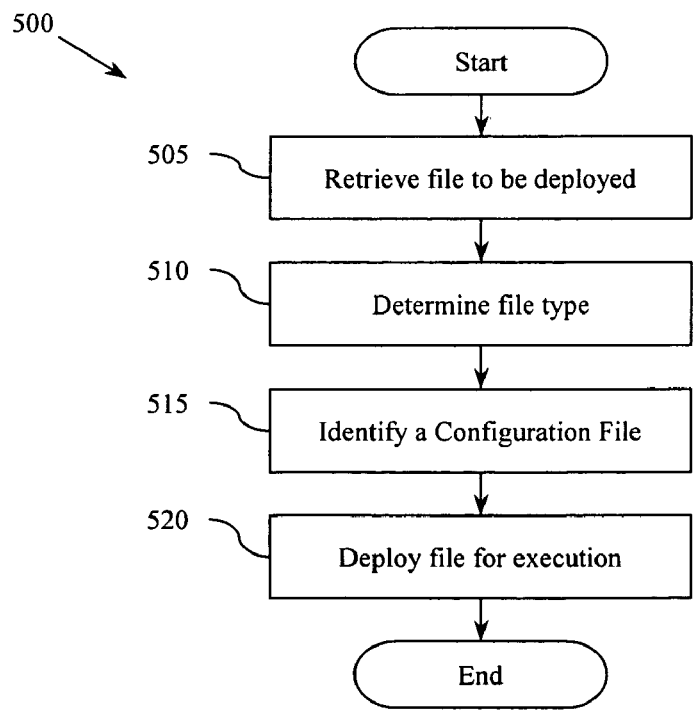
FIG. 5 illustrates another example methodology that can be associated with deploying files.

Example methods may be better appreciated with reference to the flow diagrams of FIGS. 4 and 5. While for purposes of simplicity of explanation, the illustrated methodologies are shown and described as a series of blocks, it is to be appreciated that the methodologies are not limited by the order of the blocks, as some blocks can occur in different orders and/or occur concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. In the case where the logic may be software, a flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software logic may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented, and/or artificial intelligence techniques. The foregoing applies to all methodologies herein.

With reference to FIG. 4, an example methodology 400 is illustrated that can be associated with automatically deploying a file. The example methodology 400 will be described with reference to an example configuration where a user submits a file to be deployed to a file repository that is configured for receiving such files. The method 400 can include polling the file repository to determine if a new file is present (Block 405). If, at Block 410, no new file is present, the process returns to Block 405 where the file repository can be again polled. The polling can be performed at any selected interval like every minute, half hour, hour, or other interval, and may even include continuous monitoring if desired. In one example, the polling can include reading the contents of a designated location of the file repository to determine if the contents have changed.

If, at Block 410, a new file to deploy is present, the method can determine if a configuration file is present (Block 415). Block 415 may include determining the type of file that is to be deployed and then identifying a configuration file that is associated with the file type. Contents of the file to be deployed can then be prepared using the configuration file (Block 420). As described in previous examples, the configuration file can include settings, parameters, instructions, and other commands for preparing the file for deployment.

In one example, the configuration file can be a text file, a markup language file like an extensible markup language (XML) file, or other file type that can be read. The configuration file can then be parsed to retrieve its contents. In another example, the configuration file can have a predetermined format that is known by the deployment logic so that the contents can be properly retrieved. Using the contents from the configuration file, the file to be deployed can then be deployed to a computing environment like a server (Block 425). Optionally, once the file is successfully deployed, an automatic notice can be transmitted to the user that initially submitted the file for deployment.

In one scenario where the software developer submits a file for deployment in order to test the file for quality assurance, the deployment methodology 400 may deploy the file onto, for example, a quality assurance server. Once deployed, the software developer can test the file to determine if it is functioning properly. If the software is functioning properly, a mechanism can be provided that allows the developer to indicate to the system that testing has been completed. In one example, a "publish" button can be configured to indicate that the software has been tested and can be published. The software can then be prepared for deployment into a production environment by, for example, having the software developer resubmit the file for deployment.

Since a production environment can have different configurations and settings as compared to a quality assurance environment, changes to the configuration file may be made so that the file is prepared for deployment appropriately. For example, different databases may be accessed during runtime in the production environment as opposed to the quality assurance environment. Of course, other differences in settings between the environments can exist which are too numerous to list. The deployment logic 300 can then automatically prepare the file for deployment into the production environment using the same process of methodology 400 except that different parameters and/or instructions may be used from a modified or new configuration file.

Illustrated in FIG. 5 is another example methodology 500 that can be associated with automatically deploying files. The methodology 500 will be described with reference to a similar configuration as in FIG. 4 where a designated location is used to submit files to be deployed. Configuration files may also be used as described previously. Upon initiating the methodology 500, the file to be deployed is retrieved from the designated location (Block 505). At Block 505, it is assumed that a determination has been made that a file is present within the designated location. The methodology 500 may then include determining a file type of the file to be deployed (Block 510). Based on the file type, the methodology 500 can perform appropriate actions for preparing the file type for deployment. This may include identifying a configuration file that may be associated with the file to be deployed (Block 515).

The file can then be deployed for execution using the configuration file (Block 520). As previously described, the configuration file may include parameters and special instructions that can be executed in order to prepare the file for deployment. Different sets of operations are typically performed for different types of files. Even similar file types can be deployed differently depending on desired settings for a file. Thus, instructions used in the configuration file can be selected based on the file type of the file to be deployed and/or desired custom settings. As such, a J2EE application will be processed differently than a FORMS file and their respective configuration files will include different instructions for the deployment process to follow.

With the example systems, methods, and other embodiments of the deployment logic described herein, a computer system can have the ability to manage different file types and programmatically deploy the different file types. In this manner, a dynamic application can be treated as static content while reducing or even eliminating manual operations performed during a deployment process.

Figure 6:
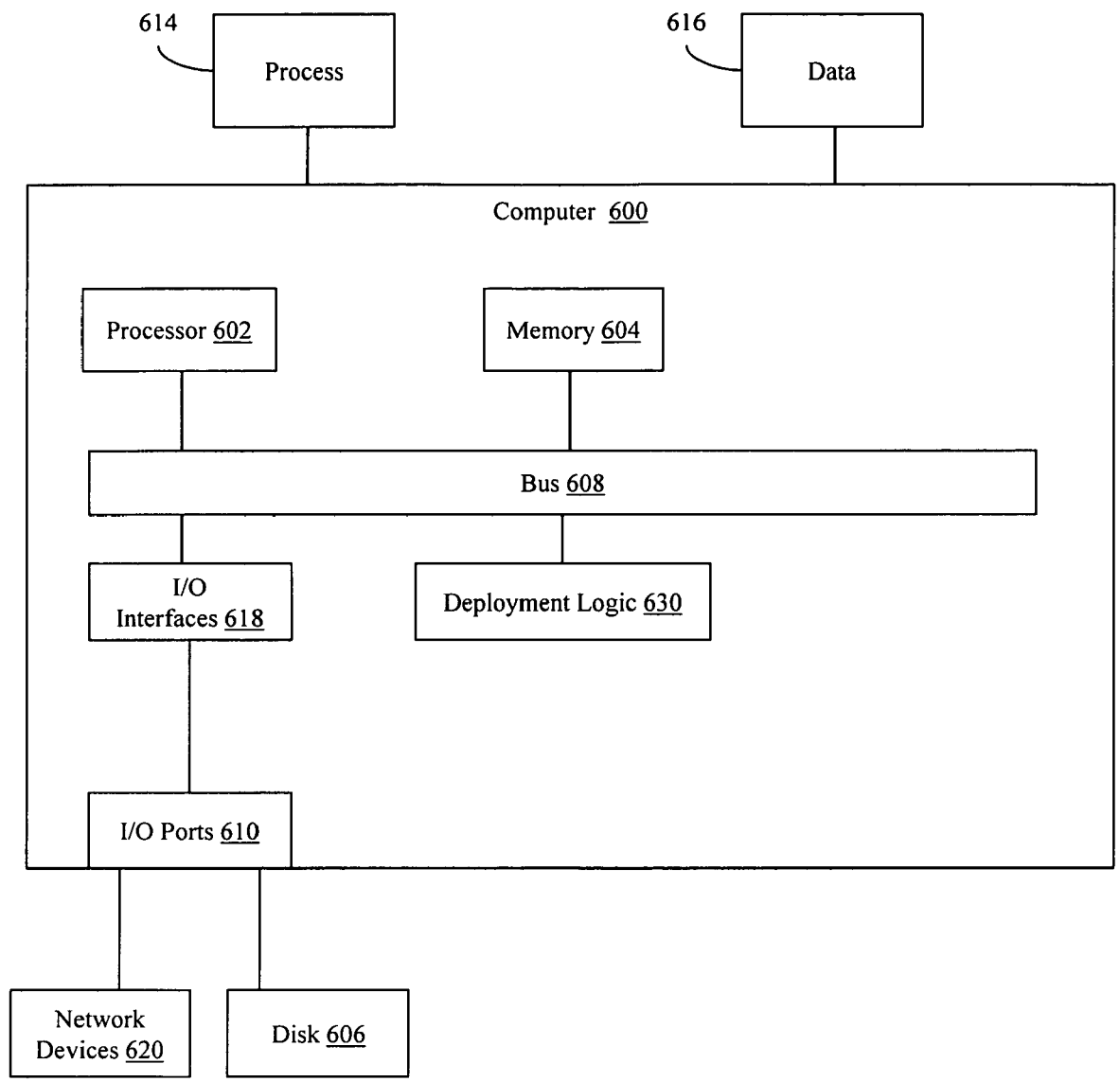
FIG. 6 illustrates an example computing environment in which example systems and methods described herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, the computer 600 may include a deployment logic 630 configured to facilitate automatic deployment of a file. The file may be accessed from a designated location or deployment repository that may be part of or remote to the computer 600. The deployment logic 630 can be implemented similar to the deployment logic 100 and 300 described in FIGS. 1 and 3, respectively, and/or the other systems and methods described herein. For example, the deployment logic 630 can be embodied as a software application, a background process, a thread, or other desired form of software or logic.

Generally describing an example configuration of the computer 600, the processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 620 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system, comprising:
    a deployment logic stored on a computer-readable medium and configured to automatically prepare one or more files for deployment that are retrievable from a designated location, where for a selected file to be deployed, the deployment logic being further configured to:
    identify a file type of the selected file;
    match the file type to a configuration file that is associated to the file type where the configuration file includes instructions for deploying the selected file; and
    configured to deploy the selected file for execution on one or more servers in accordance with the instructions from the matched configuration file.

2. The system of claim 1, the deployment logic being configured to poll the designated location to determine if new files for deployment are present.

3. The system of claim 1, the deployment logic being configured to prepare the one or more files for deployment using a configuration file that includes instructions for deploying the one or more files and is associated to the one or more files.

4. The system of claim 3 further including a configuration data store configured to maintain the configuration file that is associated to the one or more files for deployment.

5. The system of claim 1, the deployment logic being configured to prepare the one or more files based on a file type of the one or more files.

6. The system of claim 1, the deployment logic being configured to generate a notice that indicates if deployment of the one or more files is complete.

7. The system of claim 1 where the designated location defines a file repository configured to receive the one or more files for deployment.

8. The system of claim 1 where the one or more files include an executable application.

9. The system of claim 1 where the system is embodied as a computer-readable medium that provides executable instructions that form the deployment logic.

10. A computing system, comprising:
    one or more processors configured to execute instructions;
    a memory configured to provide the instructions to the one or more processors;
    a file data store configured to receive files to be deployed;
    a configuration data store configured to receive configuration files from a user, the configuration files being associated with the files to be deployed and including instructions for processing the files to be deployed; and
    a deployment logic configured to be executed by the one or more processors, the deployment logic being configured to:
    automatically access a file for deployment from the file data store;
    select and access a configuration file from the configuration data store that is associated with the file for deployment, where the selecting includes matching the file type of the file to be deployed to a configuration file that is associated to the file type, and to retrieve the instructions for processing the file to be deployed from the selected configuration file; and
    deploy the file for execution onto one or more servers using the instructions from the configuration file.

11. The computing system of claim 10 where the file to be deployed includes multiple files that are grouped together.

12. The computing system of claim 10 where the deployment logic being configured to determine a file type of the file for deployment, and to select and access the configuration file that is associated with the file type of the file.

13. The computing system of claim 10 further including logic to notify a user when the deployment is complete.

14. The computing system of claim 10, the deployment logic being configured to poll the file data store to determine if a file is present to deploy.

15. The computing system of claim 10 where the file data store is configured as a designated location for deploying files on a computer-readable medium and, the deployment logic is configured to respond to a file being placed in the file data store, causing the deployment logic to access the file and initiate deployment.

16. A method comprising:
    polling a deployment repository to determine if a file to be deployed is present;
    if the file is present, accessing contents of the file from the deployment repository;
    determining whether a configuration file exists that is associated with the file where the determining includes selecting a configuration file from a plurality of configuration files based on a file type of the file to be deployed, and if present, accessing contents of the configuration file, the configuration file including instructions for deploying the file;
    preparing the contents of the file for deployment based on at least the instructions from the configuration file; and
    deploying the contents for execution on one or more servers.

17. The method of claim 16 further including automatically notifying a user when the deploying is completed.

18. The method of claim 16 where the preparing is based on a file type of the file.

19. The method of claim 16 where accessing the contents of the configuration file includes parsing the configuration file.

20. The method of claim 16 including providing a plurality of configuration files each being associated with a file type to be deployed where a configuration file includes at least instructions for automatically deploying an associated file type.

21. A method, comprising:
   retrieving a file to be deployed from a deployment repository;
   determining a file type of the file to be deployed;
   identifying a configuration file associated with the file type, the configuration file including at least commands for deploying a file having the file type;
   deploying the file for execution on one or more servers, the deploying including at least executing the commands from the configuration file.

22. The method of claim 21 further including providing the deployment repository for receiving files to be deployed.

23. The method of claim 21 further including generating a notice that indicates when the deploying is completed.

24. The method of claim 21 further including polling the deployment repository to determine if the file to be deployed is present.

25. The method of claim 21 further including providing a plurality of configuration files each being associated with a file type to be deployed where a configuration file includes at least instructions for automatically deploying an associated file type.

26. A computer-readable medium storing processor executable instructions operable to perform a method, the method comprising:
   accessing a file to be deployed from a designated location, the file being of a file type;
   identify a configuration file associated with the file type, the configuration file including at least commands for deploying a file having the file type; and
   deploying the file for execution on one or more servers, the deploying including at least executing the commands from the configuration file.

27. A system, comprising:
means for automatically deploying a file for execution where the means for automatically deploying being configured to process a plurality of file types for deployment where for a selected file to be deployed having a file type, the means for automatically deploying further comprising:
   means for determining the file type;
   means for selecting a configuration file associated with the file type from a plurality of configuration files; and
   means for deploying the selected file in accordance with instructions from the selected configuration file.

* * * * *

UNITED STATES PATENT AND TRADEMARK OFFICE
CERTIFICATE OF CORRECTION

| | | |
|---|---|---|
| PATENT NO. | : 7,895,591 B2 | Page 1 of 1 |
| APPLICATION NO. | : 10/970121 | |
| DATED | : February 22, 2011 | |
| INVENTOR(S) | : Spears | |

It is certified that error appears in the above-identified patent and that said Letters Patent is hereby corrected as shown below:

In column 3, line 59, delete "servelet," and insert -- servlet, --, therefor.

Signed and Sealed this
Fourth Day of October, 2011

David J. Kappos
*Director of the United States Patent and Trademark Office*